No. 870,011. PATENTED NOV. 5, 1907.
F. C. BROCK & E. M. DU BOIS.
STORM FRONT FOR VEHICLES.
APPLICATION FILED MAR. 8, 1907.
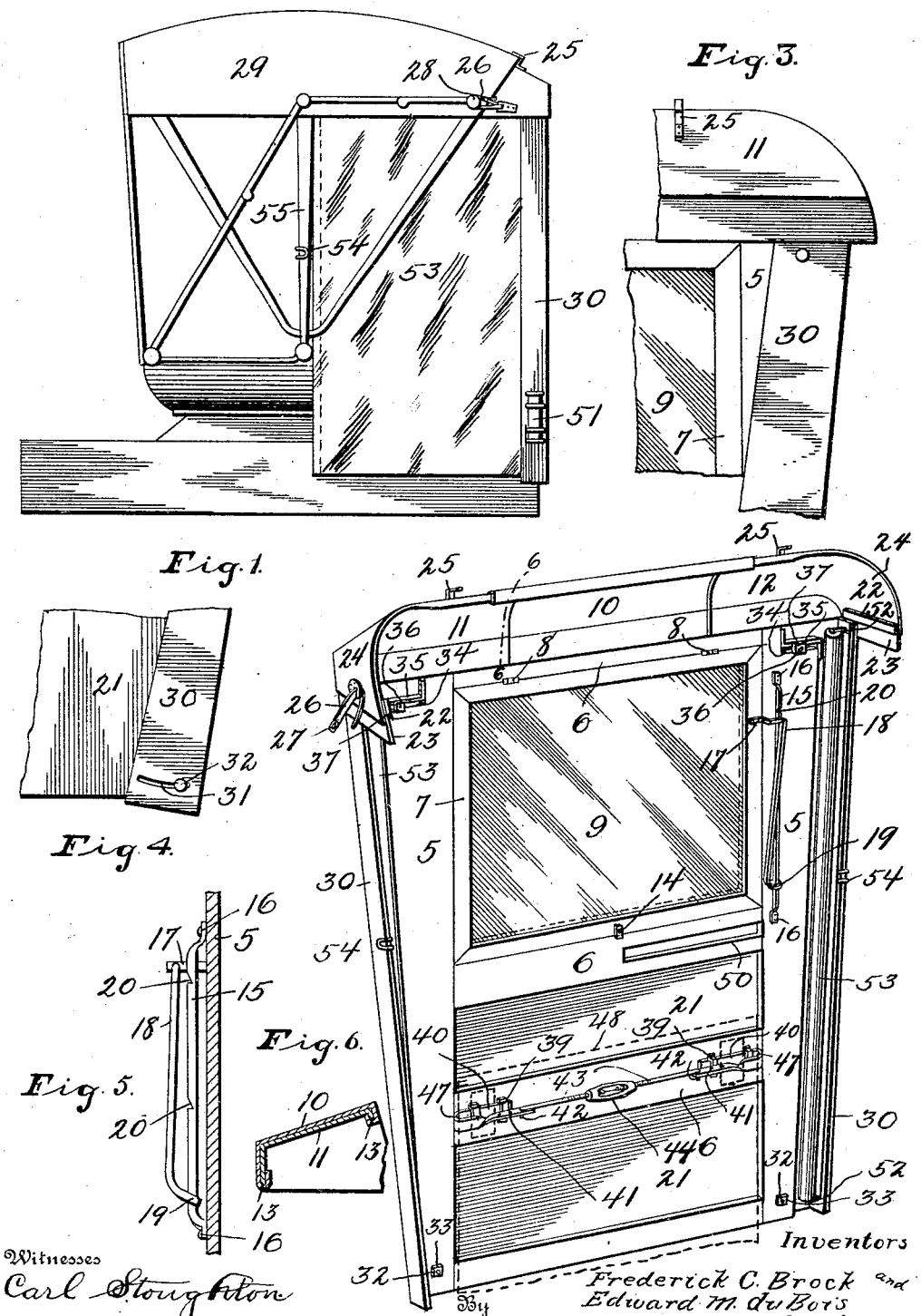
Witnesses
Carl Stoughton
F. G. Campbell
Inventors
Frederick C. Brock and
Edward M. du Bois
By Chester C. Shepherd
Attorney

UNITED STATES PATENT OFFICE.

FREDERICK C. BROCK AND EDWARD M. DU BOIS, OF COLUMBUS, OHIO, ASSIGNORS TO THE VEHICLE APRON & HOOD COMPANY, OF COLUMBUS, OHIO, A CORPORATION OF OHIO.

STORM-FRONT FOR VEHICLES.

No. 870,011.  Specification of Letters Patent.  Patented Nov. 5, 1907.

Application filed March 8, 1907. Serial No. 361,357.

*To all whom it may concern:*

Be it known that we, FREDERICK C. BROCK and EDWARD M. DU BOIS, citizens of the United States, residing at Columbus, in the county of Franklin and State of Ohio, have invented certain new and useful Improvements in Storm-Fronts for Vehicles, of which the following is a specification.

Our invention relates to storm fronts for vehicles and has for its object the provision of a device of this character which is adapted to be readily secured to vehicles already in use and which is constructed in such manner as to be adjustable to vehicles of varying sizes.

Further objects and advantages of the invention will be set forth in the detailed description which now follows.

In the accompanying drawing: Figure 1 is a side elevation of a vehicle having our improved storm front secured thereto, Fig. 2 is a perspective view looking from the inside of the front, Fig. 3 is a detail front elevation of one corner of the storm front, Fig. 4 is a detail front elevation of one of the lower corners of the storm front, Fig. 5 is a detail sectional view illustrating a latch which is used to secure a swinging window in an elevated position, and, Fig. 6 is a detail section upon line 6—6 of Fig. 2.

Like numerals designate corresponding parts in all of the figures of the drawing.

The main frame of the storm front is preferably formed of wood and consists of vertical side members 5 which are wider at their upper ends than at their lower n ds, and horizontal connecting bars 6. A window frame 7 is hinged as at 8 to swing inwardly, this frame being filled with transparent material such as celluloid or glass 9. Secured to the upper horizontal member 6 is the central portion 10 of an inwardly extending hood. The end members 11 and 12 of this hood are supported from the central member 10 and are slidably disposed with relation thereto, the upper and lower edges of the central member 10 being bent over the edges of the outer members 11 and 12 as at 13 (see Fig. 6). A latch of any desired construction which is indicated at 14 is adapted to hold the window closed.

A vertical notched bar 15 is secured at 16 to one of the vertical members 5. An L-shaped arm 17 is secured to the window frame and a link 18 is pivoted to the outer end of this arm. This link is provided at its lower end with an eyelet 19 which surrounds the rod 15 and slides thereon. When the window is elevated, the edge of this eyelet catches in the notches 20 of the rod 15 to maintain this window in its elevated position. The outer face of the lower portion of the main frame from the horizontal member 6 to the bottom of the frame, is covered with water-proof material 21, this material also covering the outer faces of the members 5.

Stiffening strips 22 are secured to the members 11 and 12 of the hood and strips of water-proof flexible material 23 depend from the ends 24 of the members 11 and 12 of the hood. Stop members 25 are carried by the hood and are adapted to engage over the front bow to limit the inward movement of this hood. Straps 26 are secured to these end members 24, said straps being provided with buckles 27 and serving to draw the hood inwardly when engaged about the prop nuts 28 of a buggy-top 29. L-shaped extension strips 30 are vertically arranged at each edge of the storm front, these extension strips having slots 31 formed therein at their lower edges (see Figs. 2 and 4), for the reception of bolts 32 which are carried by the lower ends of the side members 5 of the main frame. Nuts 33 are threaded upon the inner ends of these bolts and when tightened bind the L-shaped extension strips against movement with relation to the main frame.

The upper edges of the side members 5 of the frame are cut out as at 34. Metallic strips 35 are secured in position in such manner as to leave a space between themselves and the members 5, in which bolts 36 are adapted to slide. Nuts 37 are threaded upon the inner ends of these bolts, said bolts being carried by the extension strips 30. When these nuts are tightened, the outer edges of the extension strips are bound against movement with relation to the main frame, these extension strips serving to adjust the storm front to vehicles of varying sizes.

Keepers 39 are secured to the inner face of one of the horizontal members 6 and bars 40 are slidably disposed in these keepers. The outer ends of these bars are bent to the position illustrated in Fig. 2 and are provided with a series of perforations 41, which are adapted to be engaged by the hooked ends 42 of rods 43. A turn-buckle 44 is adapted to draw these bars 40 toward each other to cause their bent portions 47 to engage a buggy dash which is illustrated in dotted lines at 48 in Fig. 2. The horizontal member 6 at the lower edge of the window is cut out at 50 for the passage of the reins and a whip socket 51 is carried by one of the extension strips 30. Brackets 52 which are carried by the extension strips 30 are adapted to receive spring rollers like the ordinary spring actuated shade roller. Side curtains 53 are carried by these rollers and are provided with hooks 54 which are adapted to engage about the vertical portion 55 of a buggy top as is best illustrated in Fig. 1.

The operation of the device is as follows: When it is desired to secure this storm front in position upon a vehicle, the structure shown in Fig. 2 is placed in such position that the dash of a buggy extends up between the bars 40 so that when the turn buckle 44 is turned to draw these bars toward each other, said bars will grip the dash at its side edges. At this time the hood projects inside of the front bow, its inward movement being limited by the stop members 25. The strap 26 is then engaged about the prop nut and is buckled therearound to draw the hood up against the front bow. The extension strips 30 provide means for widening the structure to accommodate buggies of varying sizes. After the main structure has been placed in position and secured as above described, the side curtains may be drawn from the spring rollers and the hooks 54 engaged about the vertical members 55 of the buggy top to thereby entirely inclose the forward portion of the buggy. The telescopic arrangement of the members 11 and 12 with relation to the member 10, also provides means for accommodating buggies of varying sizes.

From the foregoing description, it will be seen that the structure herein shown and described provides efficient means for sheltering the occupant of a vehicle from wind, rain, snow or the like and one which may be readily applied, cheaply constructed and which is adapted to be secured upon vehicles of varying sizes.

While the elements shown and described are well adapted to serve the purposes for which they are intended, it is to be understood that our invention is not limited to the precise construction set forth, but includes within its purview such changes as may be made within the scope of the appended claims.

What we claim, is:

1. In a storm front for vehicles, the combination with a frame, of means for clamping said frame to the dash-board of a vehicle, a hood carried by said frame, stop members carried by said hood adapted to engage the front bow of a vehicle, means for drawing said hood toward said bow, vertical extension strips located at each edge of said frame and movable with relation thereto, spring rollers supported at each edge of said frame and upon said movable strips, curtains carried by said rollers, and members secured to said curtains which are adapted to engage about a portion of the vehicle top.

2. In a device of the character described, the combination with a frame, of a hood secured to the upper edge of said frame, said hood being made in sections which telescope with relation to each other, stop members carried by said hood which are adapted to rest against the front bow of a vehicle, means for drawing said hood toward said bow, means for clamping said frame to the dash-board of a vehicle, vertical extension strips located at the edges of the main frame and movable with relation thereto, means for clamping said strips against movement with relation to said frame, spring rollers carried by said extension strips, curtains carried by said rollers, and members carried by said curtains which are adapted to engage a portion of the vehicle top.

3. In a storm front for vehicles, the combination with a frame, of means for clamping said frame to the dash-board of a vehicle, vertical extension strips located at each side of said frame and movable with relation to said frame, means for clamping said strips in their adjusted positions, and vertically disposed spring actuated curtain rollers mounted upon and movable with said extension strips.

4. In a device of the character described, the combination with a frame, of means for securing said frame to a vehicle, a hood carried by the upper portion of the frame, vertical extension strips having bolt and slot connections with said frame and adapted to be moved bodily with relation to said frame, spring actuated rollers carried by said extension strips, curtains carried by said rollers, and means for securing said curtains to a portion of the vehicle.

5. In a device of the character described, the combination with a supporting frame, of means for securing said frame to a vehicle, a hood carried by the upper portion of the frame, vertical extension strips mounted at the sides of the frame and movable with relation to said frame, spring actuated rollers carried by said extension strips, curtains mounted upon said rollers, and means for holding said curtains in position when they are withdrawn from said rollers.

In testimony whereof we affix our signatures in presence of two witnesses.

FREDERICK C. BROCK.
EDWARD M. DU BOIS.

Witnesses:
A. L. PHELPS,
L. CARL STOUGHTON.